US012499156B2

(12) United States Patent
Sreedhara

(10) Patent No.: US 12,499,156 B2
(45) Date of Patent: Dec. 16, 2025

(54) RECOMMENDING RESULTS IN MULTIPLE LANGUAGES FOR SEARCH QUERIES BASED ON USER PROFILE

(71) Applicant: Rovi Product Corporation, San Jose, CA (US)

(72) Inventor: Arun Sreedhara, Karnataka (IN)

(73) Assignee: Rovi Product Corporation, San Jose, CA (US)

( * ) Notice: Subject to any disclaimer, the term of this patent is extended or adjusted under 35 U.S.C. 154(b) by 67 days.

(21) Appl. No.: 18/130,180

(22) Filed: Apr. 3, 2023

(65) Prior Publication Data

US 2023/0237098 A1 Jul. 27, 2023

Related U.S. Application Data

(63) Continuation of application No. 16/926,825, filed on Jul. 13, 2020, now Pat. No. 11,620,340, which is a
(Continued)

(51) Int. Cl.
| | |
|---|---|
| *G06F 16/9032* | (2019.01) |
| *G06F 16/953* | (2019.01) |
| *G10L 15/00* | (2013.01) |
| *G10L 15/02* | (2006.01) |
| *G10L 15/065* | (2013.01) |
| *G10L 15/18* | (2013.01) |
| *G10L 15/187* | (2013.01) |
| *G10L 15/22* | (2006.01) |

(Continued)

(52) U.S. Cl.
CPC ...... *G06F 16/90332* (2019.01); *G06F 16/953* (2019.01); *G10L 15/005* (2013.01); *G10L 15/02* (2013.01); *G10L 15/065* (2013.01); *G10L 15/1822* (2013.01); *G10L 15/187* (2013.01); *G10L 15/22* (2013.01); *G10L 25/51* (2013.01); *G10L 25/54* (2013.01); *G10L 2015/025* (2013.01); *G10L 2015/223* (2013.01)

(58) Field of Classification Search
CPC ............ G06F 16/90332; G06F 16/953; G10L 15/005; G10L 15/02; G10L 15/065; G10L 15/1822; G10L 15/187; G10L 15/22; G10L 25/51; G10L 25/54; G10L 2015/025; G10L 2015/223
See application file for complete search history.

(56) References Cited

U.S. PATENT DOCUMENTS

| 7,027,987 B1 * | 4/2006 | Franz ...................... G10L 15/22 707/999.005 |
|---|---|---|
| 8,635,205 B1 | 1/2014 | Kang et al. |

(Continued)

OTHER PUBLICATIONS

Buzo et al., Multilingual Query by Example Spoken Term Detection for Under-Resourced Languages, 2013, IEEE, pp. 1-6. (Year: 2013).*
(Continued)

*Primary Examiner* — Cheyne D Ly
(74) *Attorney, Agent, or Firm* — Lerner David LLP

(57) ABSTRACT

Systems and methods for a media guidance application that generates results in multiple languages for search queries. In particular, the media guidance application resolves multiple language barriers by taking automatic and manual user language settings and applying those settings to a variety of potential search results.

20 Claims, 8 Drawing Sheets

Related U.S. Application Data continuation of application No. 15/720,917, filed on Sep. 29, 2017, now Pat. No. 10,769,210.

(51) Int. Cl.
*G10L 25/51* (2013.01)
*G10L 25/54* (2013.01)

(56) References Cited

U.S. PATENT DOCUMENTS

| | | | |
|---|---|---|---|
| 9,129,591 B2 | 9/2015 | Sung et al. | |
| 9,135,245 B1 | 9/2015 | Nijim et al. | |
| 2004/0194099 A1 | 9/2004 | Lamping et al. | |
| 2007/0033003 A1* | 2/2007 | Morris | G10L 15/08 |
| | | | 704/9 |
| 2008/0270138 A1* | 10/2008 | Knight | G06F 16/434 |
| | | | 704/E15.045 |
| 2009/0043581 A1* | 2/2009 | Abbott | G10L 15/187 |
| | | | 704/254 |
| 2009/0164218 A1* | 6/2009 | Ma | G06F 16/632 |
| | | | 704/254 |
| 2010/0138411 A1* | 6/2010 | Judy | G06F 16/433 |
| | | | 707/723 |
| 2010/0262612 A1 | 10/2010 | El-Saban et al. | |
| 2012/0158453 A1* | 6/2012 | Chung | G06Q 10/06316 |
| | | | 705/7.26 |
| 2012/0278309 A1 | 11/2012 | Tang et al. | |
| 2013/0054238 A1* | 2/2013 | Bodell | G10L 15/22 |
| | | | 704/E15.044 |
| 2014/0280295 A1 | 9/2014 | Kurochkin et al. | |
| 2015/0006147 A1 | 1/2015 | Schmidt | |
| 2018/0190271 A1* | 7/2018 | Bhaya | H04M 3/4931 |
| 2018/0374476 A1 | 12/2018 | Lee et al. | |

OTHER PUBLICATIONS

Chu et al., Microsoft Mulan—A Bilingual TTS System, 2003, IEEE, pp. 264-267. (Year: 2003).*

Seneff et al. disclose, Second Language Acquisition Through Human Computer Dialogue, 2004, IEEE, pp. 341-344. (Year: 2004).*

Fung et al., Multilingual Spoken Language Processing, IEEE Signal Processing Magazine [89] May 2008, pp. 1-9. (Year: 2008).

* cited by examiner

RECOMMENDING RESULTS IN MULTIPLE LANGUAGES FOR SEARCH QUERIES BASED ON USER PROFILE

CROSS-REFERENCE TO RELATED APPLICATIONS

This application is a continuation of U.S. application Ser. No. 16/926,825, filed on Jul. 13, 2020, which is a continuation of U.S. application Ser. No. 15/720,917 filed on Sep. 29, 2017 the disclosure of which is incorporated herein by reference.

BACKGROUND OF THE INVENTION

Voice recognition as a technique for interacting with user devices has grown popular. These systems typically depend on recognizing words and phrases spoken by a user. To recognize these words, the devices process received voice commands according to the language of the user. However, many users may speak in multiple languages and/or speak a language with a particular accent, which may not be recognized by the user device. Moreover, the device may not be able to provide results that are specific to a particular language or accent.

SUMMARY

Accordingly, systems and methods are described herein for a media guidance application that generates results in multiple languages for search queries. Thus, users no longer need to worry that a device may not recognize a particular language or accent, or that the device may not be able to provide results that are specific to a particular language or to a particular accent. In particular, the media guidance application resolves multiple language barriers by taking automatic and manual user language settings and applying those settings to a variety of potential search results.

For example, the media guidance application (e.g., implemented on a user device) may automatically apply multiple language models to subsequent searches in response to determining that a current search produced results corresponding to those multiple languages. For example, the media guidance application may receive a first voice query from a user, wherein the user corresponds to a user profile. The media guidance application may apply a first language model, based on the user profile, to the first voice query to identify a first plurality of search results based on the first voice query, wherein the first language model corresponds to a first language (e.g., English). The media guidance application may automatically determine that the first search result corresponds to a first language (e.g., English) and that a second search result corresponds to a second language (e.g., Hindi). In response to determining that the second search result corresponds to the second language, the media guidance application may update the user profile to apply a second language model to searches, wherein the second language model corresponds to the second language. The media guidance application may then receive a second voice query from the user, apply both the first language model and the second language model, based on the user profile, to the second voice query to identify a second plurality of search results based on the second voice query, and generate for display, on the display device, the second plurality of search results. Thus, the media guidance application automatically applies multiple language models to subsequent searches in response to determining that a current search produced results corresponding to those multiple languages.

In another example, the media guidance application may rank search results based on how well different interpretations of a voice query match different language models, not simply how popular a given search result is in each language. The media guidance application (e.g., implemented on a user device) may receive an audible input voice query from the user, whose user profile is stored in memory. The media guidance application may receive a user input indicating a first and second language model, which dictate the search results. In response to receiving the user input, the media guidance application may parse that input into a first and second audio segment, based on audible breaks from the user. The media guidance application may then determine a first text query based on the first language and subsequently rank that text query. The media guidance application may determine a second text query based off the second language and rank that text query as well. The media guidance application may then generate for display a first search result for the first text query and a second search result for the second text query, wherein the first search result and the second search result are ordered according to the first composite ranking and the second composite ranking, respectively. Thus, the media guidance application provides search results ranked based on how well different textual interpretations of a voice query match different language models, not simply how popular a given search result is in each language.

In some aspects, the media guidance application may receive, via an audio input device, a first voice query from a user, wherein the user corresponds to a user profile that is stored in memory. For example, the media guidance application may store a user profile that has information on the user's tendencies and preferences, in particular the languages used and/or preferred by the user.

The media guidance application may apply a first language model, based on the user profile, to the first voice query to identify a first plurality of search results based on the first voice query, wherein the first language model corresponds to a first language. For example, the media guidance application may determine that the first language setting corresponds to English (e.g., either by default or based on a prior user selection). Thus, the media guidance application may use an English language model for an initial search. To apply a language model, the media guidance application, in some embodiments, may parse the first voice query to identify a first audio segment and a second audio segment, based on audible breaks in the first voice query, comparing the first audio segment to the first set of phonemes to determine a first resolved word corresponding to the first audio segment, and determining a first text query based on the first resolved word. For example, if the first voice query was "Vincent Chase", the media guidance application may identify a first audio segment as "Vincent" and the second audio segment "Chase". The media guidance application may, additionally or alternatively, indicate a first set of phonemes for a first language model used to identify the first plurality of search results. For example, any given word in a certain language is a combination of phonemes. The media guidance application may use the various combinations of phonemes of a certain language to resolve the audio segments into text queries.

The media guidance application may generate for display, on a display device, the first plurality of search results. For example, the user will be able to view a variety of results based on his or her voice input. The results could be several items, such as movies related to a given actor.

The media guidance application may retrieve, from the memory, first metadata for the first search result and second metadata for the second search result. The media guidance application may then automatically determine that the first metadata for the first search result of the first plurality of search results indicates that the first search result corresponds to a first language, and that the second metadata for the second search result of the first plurality of search results indicates that the second search result corresponds to a second language. For example, the media guidance application may process metadata corresponding to each search result to determine a language or region typically associated with the search result. For example, in response to metadata detected indicating that a movie was filmed in India, produced by the Indian film industry (e.g., Bollywood), or featuring Indian actors, the media guidance application may process metadata to determine a language corresponding to that metadata other than English.

The media guidance application may, in response to determining that the second metadata for the second search result of the first plurality of search results indicates that the second search result corresponds to the second language, update the user profile to apply a second language model to searches, wherein the second language model corresponds to the second language. For example, in response to determining that the second search result corresponds to Hindi, the media guidance application may update the user profile to perform searches in both English and Hindi. In some embodiments, the media guidance application may update the user profile where updating the user profile includes: retrieving a language setting from the user profile, comparing a language corresponding to the language setting to the second language, and determining that the second language does not correspond to the language corresponding to the language setting. Alternatively, if the media guidance application determines that the first metadata for the first search result of the first plurality of search results indicates that the first search result corresponds to the first language, the media guidance application maintains the language setting (e.g., listing only English) in the user profile.

The media guidance application may receive a second voice query from the user. For example, now that the user profile has been updated with a first and second language model, the application can analyze an additional voice query under the new language preferences (e.g., English and Hindi). The media guidance application may apply both the first language model and the second language model, based on the updated user profile, to the second voice query to identifying a second plurality of search results based on the second voice query.

The media guidance application may generate for display, on the display device, the second plurality of search results. For example, the second plurality of search results may include search results identified after processing the voice query in both English and Hindi.

In some embodiments, the media guidance application may update the user profile after receiving a user confirmation to apply the second language model to searches, wherein a prompt for receiving the user confirmation is generated for display in response to determining that the second metadata for the second search result of the first plurality of search results indicates that the second search result corresponds to the second language. For example, in response to determining that additional languages may be used (or may be desired by a user), the media guidance application may prompt the user for confirmation before updating the language settings in the user profile.

In some embodiments, the media guidance application may also adjust dialect settings. For example, the media guidance application may automatically determine that the second metadata for the second search result of the first plurality of search results also indicates that the second search result corresponds to a first dialect of the second language, and, in response to determining that the second metadata for the second search result of the first plurality of search results also indicates that the second search result corresponds to the first dialect of the second language, update the user profile to apply a third language model to searches, wherein the third language model corresponds to the first dialect of the second language.

In some embodiments, the media guidance application may apply the first language model, based on the user profile, to the first voice query to identify the first plurality of search results based on the first voice query, which includes: determining a first numerical ranking for the first resolved word in the first language and a second numerical ranking for a second resolved word in the first language, based on a likelihood of usage of the first resolved word in the first language and the second resolved word in the first language, and determining a first composite score for the first text query based on summing the first numerical ranking and the second numerical ranking.

In some embodiments, the media guidance application may further comprise generating for display, on the display device, a first search result for the first text query, wherein the first search result is ordered among search results based on the first composite ranking.

In some aspects, the media guidance application may identify, using control circuitry, a first audio segment and a second audio segment, based on audible breaks in the first voice query. For example, if the user says "Priyanka Chopra" into the user device, the media guidance application may determine that "Priyanka" is the first audio segment and "Chopra" is the second segment, based on the audible break in between the two words.

The media guidance application may determine a first resolved word in a first language and a second resolved word in the first language by combining a first set of phonemes to the first audio segment and second audio segment, respectively, where the first set of phonemes are selected from phonemes of the first language model. For example, "Priyanka" and "Chopra" may each be processed in the first language model, which could be English in this case, respectively. In some embodiments, there may be multiple potential text queries due to the various phenome combinations in each language. Since the input is in speech form, the media guidance application may analyze the segments into resolved words, which are possible forms of the input query. Accordingly, the media guidance application may interpret "Priyanka" as "Preeyanka", "Priyonka", etc.

The media guidance application may determine a first numerical ranking for the first resolved word in the first language and a second numerical ranking for the second resolved word in the first language, based on a likelihood of usage of the first resolved word in the first language and the second resolved word in the first language. For example, the media guidance application may rank the different possibilities for the names "Priyanka" and "Chopra" based on each resolved word's prevalence and likelihood of usage.

The media guidance application may determine a first composite score for the first text query based on summing the first numerical ranking and the second numerical ranking. For example, because the audio segments in the voice query are related, the media guidance application may combine the first audio segment resolved words with the second audio segment resolved words for the first language by taking the ranks of the first and second resolved words and adding them together, giving a total composite score.

The media guidance application may determine a first resolved word in a second language and a second resolved word in the second language by combining a second set of phonemes to the first audio segment and second audio segment, respectively, where the second set of phonemes are selected from phonemes of the second language model. For example, "Priyanka Chopra" will be analyzed in a second language model, e.g., Hindi, and the media guidance application may produce a variety of resolved words.

The media guidance application may determine a third numerical ranking for the first resolved word in the second language and a fourth numerical ranking for the second resolved word in the second language based on a likelihood of usage of the first resolved word in the second language and the second resolved word in the second language. For example, the media guidance application may rank the different possibilities for the names "Priyanka" and "Chopra" based on each resolved word's prevalence and likelihood of usage in the Hindi language.

The media guidance application may determine a second composite score for a second text query based on summing the third numerical ranking and the fourth numerical ranking. For example, the media guidance application may produce a composite score based on all the Hindi language possibilities for combinations of the resolved first and second words.

The media guidance application may generate for display, on the display device, a first search result for the first text query and a second search result for the second text query, wherein the first search result and the second search result are ordered according to the first composite ranking and the second composite ranking, respectively. For example, the composite scores of the resolved word combinations are ranked and the highest ranked combinations are outputted for display on the screen for the user to view. For example, the media guidance application may determine the highest ranked results, based on multiple language models, and the media guidance application may display results in multiple languages. In some embodiments, the search results generated for display are above a certain threshold of prevalence and likelihood of usage. For example, if the media guidance application determines that combinations are unlikely to constitute correct results (based on the low likelihood of usage), the media guidance application may not generate for display a corresponding result.

In some embodiments, the media guidance application may automatically update a user profile to add a third language model for a third language for determining search results, without user input, in response to determining that metadata for a third search result indicates that the third search result corresponds to the third language. For example, based on search results corresponding to a third language, the media guidance application may add the third language to the user's profile automatically.

In some embodiments the media guidance application may update the user profile after receiving a user confirmation to apply the third language model for determining search results, wherein a prompt for receiving the user confirmation is generated for display in response to determining that the metadata for the third search result indicates that the third search result corresponds to the third language. For example, the media guidance application may receive a user input of a different language the user wishes to use for a search; in response, the media guidance application may prompt the user to manually enter that language into the user profile. Furthermore, in some embodiments, the media guidance application may update the user profile by retrieving the language setting from the user profile and comparing it to the language setting of the third language. If the media guidance application determines that the language differs from the setting, the media guidance application may update the setting, whereas if the language is the same the setting may be maintained.

In some embodiments the media guidance application may receive a second voice query from the user. For example, in some embodiments, the system will identify a third and fourth audio segment based on the audible breaks in the second voice query and determining, for a third text query, a first resolved word in the third language and a second resolved word in the third language model. In such cases, additional composite scores may be determined by the media guidance application and a composite score of the composite scores may be used by the media guidance application for the ranking.

It should be noted that the systems and/or methods described above may be applied to or used in accordance with other systems, methods, and/or apparatuses in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
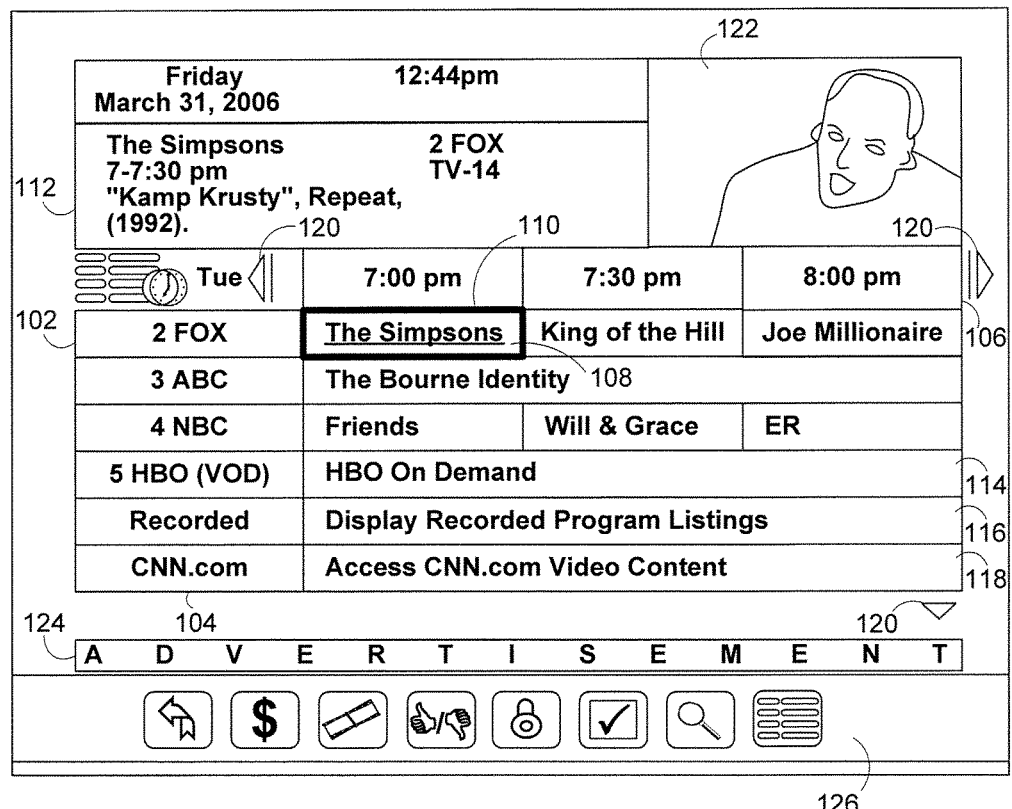
FIG. 1 shows an illustrative example of a display screen generated by a media guidance application, in accordance with some embodiments of the disclosure.

Systems and methods are described herein for a media guidance application that generates results in multiple languages for search queries. Thus, users no longer need to worry that a device may not recognize a particular language or accent, or that the device may not be able to provide results that are specific to a particular language or to a particular accent. In particular, the media guidance application resolves multiple language barriers by taking automatic and manual user language settings and applying those settings to a variety of potential search results.

As referred to herein, a media guidance application is an application which provides an interface that allows users to efficiently navigate media selections and easily identify media that they may desire. A media guidance application is referred to herein as an interactive media guidance application or, sometimes, a media guidance application or a guidance application. The media guidance application may use language modeling in speech recognition, machine translation, part-of-speech tagging, parsing, handwriting recognition, information retrieval, and other applications such as searching through media content in response to audio queries.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available through both a television and one or more of these devices. The media guidance applications may be provided as on-line applications (i.e., provided on a website), or as stand-alone applications for clients on hand-held computers, PDAs, mobile telephones, or other mobile devices. The various devices and platforms that may implement media guidance applications are described in more detail below.

For example, the media guidance application (e.g., implemented on a user device) may automatically apply multiple language models to subsequent searches in response to determining that a current search produced results corresponding to those multiple languages. As defined herein, a language model is a statistical model used to estimate the likelihood of different phrases by utilizing a probability distribution over a sequence of words. The language model may be a unigram language model, n-gram language model, exponential language model, neural language model, positional language model, etc.

For example, the media guidance application may receive a first voice query from a user, wherein the user corresponds to a user profile. As defined herein a user profile is a set of data stored in memory and it contains the user's preferences and settings. The media guidance application may be personalized based on a user's preferences and settings. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance applications by logging in or otherwise identifying themselves to the guidance applications. Customizations of the media guidance application may be made in accordance with a user profile. The customizations may include language settings in which to perform searches (as discussed below); varying presentation schemes (e.g., color scheme of displays, font size of text, etc.); aspects of media content listings displayed (e.g., only HDTV programming, user-specified broadcast channels based on favorite channel selections, re-ordering the display of channels, recommended media content, etc.); desired recording features (e.g., recording or series recordings for particular users, recording quality, etc.); parental control settings; and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

The media guidance application may apply a first language model, based on the user profile, to the first voice query to identify a first plurality of search results based on the first voice query, wherein the first language model corresponds to a first language (e.g., English). The media guidance application may automatically determine that the first search result corresponds to a first language (e.g., English) and that a second search result corresponds to a second language (e.g., Hindi). In response to determining that the second search result corresponds to the second language, the media guidance application may update the user profile to apply a second language model to searches, wherein the second language model corresponds to the second language. The media guidance application may then receive a second voice query from the user, apply both the first language model and the second language model, based on the user profile, to the second voice query to identify a second plurality of search results based on the second voice query, and generate for display, on the display device, the second plurality of search results. Thus, the media guidance application automatically applies multiple language models to subsequent searches in response to determining that a current search produced results corresponding to those multiple languages.

In another example, the media guidance application may rank search results based on how well different interpretations of a voice query match different language models, not simply how popular a given search result is in each language. The media guidance application (e.g., implemented on a user device) may receive an audible input voice query from the user, whose user profile is stored in memory. The media guidance application may receive a user input indicating a first and second language model, which dictate the search results. In response to receiving the user input, the media guidance application may parse that input into a first and second audio segment, based on audible breaks from the user. The media guidance application may then determine a first text query based off the first language and subsequently rank that text query. The media guidance application may determine a second text query based on the second language and rank that text query as well. The media guidance application may then generate for display a first search result for the first text query and a second search result for the second text query, wherein the first search result and the second search result are ordered according to the first composite ranking and the second composite ranking, respectively. Thus, the media guidance application provides search results rank based on how well different textual interpretations of a voice query match different language models, not simply how popular a given search result is in each language.

For example, if the audible input query from the user is "Sophia Vergara" and the first language model is English and the second language model is Spanish, then the media guidance application will generate a first search result in English and a second search result in Spanish. The order of the various "Sophia Vergara" search results will be based on a composite ranking of each result.

In some embodiments, the media guidance application may receive, via an audio input device, a first voice query from a user, wherein the user corresponds to a user profile that is stored in memory. For example, the media guidance application may store a user profile that has information on the user's tendencies and preferences, in particular the languages used and/or preferred by the user.

The media guidance application may apply a first language model, based on the user profile, to the first voice query to identify a first plurality of search results based on the first voice query, wherein the first language model corresponds to a first language. For example, the media guidance application may determine that the first language setting corresponds to English (e.g., either by default or based on a prior user selection). Thus, the media guidance application may use an English language model for an initial search. To apply a language model, the media guidance application, in some embodiments, may parse the first voice query to identify a first audio segment and a second audio segment based on audible breaks in the first voice query, comparing the first audio segment to the first set of phonemes to determine a first resolved word corresponding to the first audio segment, and determine a first text query based on the first resolved word.

As defined herein, a phoneme is any of several distinct units of sound in a certain language that distinguish words from other words. For example, p, b, and d in the English words, pad, pat, and bad, are phonemes that distinguish one word from another. For example, if the first voice query was "Vincent Chase", the media guidance application may identify a first audio segment as "Vincent" and the second audio segment "Chase". The media guidance application may, additionally or alternatively, indicate a first set of phonemes for a first language model used to identify the first plurality of search results. For example, any given word in a certain language is a combination of phonemes. The media guidance application may use the various combinations of phonemes of a certain language to resolve the audio segments into text queries.

The media guidance application may generate for display, on a display device, the first plurality of search results. For example, the user will be able to view a variety of results based on his or her voice input. The results could be several items, such as movies related to a given actor.

The media guidance application may retrieve, from the memory, first metadata for the first search result and second metadata for the second search result. The media guidance application may then automatically determine that the first metadata for the first search result of the first plurality of search results indicates that the first search result corresponds to a first language, and that the second metadata for the second search result of the first plurality of search results indicates that the second search result corresponds to a second language. For example, the media guidance application may process metadata corresponding to each search result to determine a language or region typically associated with the search result. For example, in response to metadata detected indicating that a movie was filmed in France, produced by the French film industry (e.g., in Paris), or featuring French actors, the media guidance application to determine a language corresponding to that metadata other than English.

The media guidance application may, in response to determining that the second metadata for the second search result of the first plurality of search results indicates that the second search result corresponds to the second language, update the user profile to apply a second language model to searches, wherein the second language model corresponds to the second language. For example, in response to determining that the second search result corresponds to French, the media guidance application may update the user profile to perform searches in both English and French. In some embodiments, the media guidance application updating the user profile includes: retrieving a language setting from the user profile, comparing a language corresponding to the language setting to the second language, and determining that the second language does not correspond to the language corresponding to the language setting. Alternatively, if the media guidance application determines that the first metadata for the first search result of the first plurality of search results indicates that the first search result corresponds to the first language, the media guidance application maintains the language setting (e.g., listing only English) in the user profile.

The media guidance application may receive a second voice query from the user. For example, now that the user profile has been updated with a first and second language model, the application can analyze an additional voice query under the new language preferences (e.g., English and French). The media guidance application may apply both the first language model and the second language model, based on the updated user profile, to the second voice query to identify a second plurality of search results based on the second voice query.

The media guidance application may generate for display, on the display device, the second plurality of search results. For example, the second plurality of search results may include search results identified after processing the voice query in both English and French.

In some embodiments, the media guidance application may update the user profile after receiving a user confirmation to apply the second language model to searches, wherein a prompt for receiving the user confirmation is generated for display in response to determining that the second metadata for the second search result of the first plurality of search results indicates that the second search result corresponds to a second language. For example, in response to determining that additional languages may be used (or may be desired by a user), the media guidance application may prompt the user for confirmation before updating the language settings in the user profile.

In some embodiments, the media guidance application may also adjust dialect settings. For example, the media guidance application may automatically determine that the second metadata for the second search result of the first plurality of search results also indicates that the second search result corresponds to a first dialect of the second language and, in response to determining that the second metadata for the second search result of the first plurality of search results also indicates that the second search result corresponds to the first dialect of the second language, update the user profile to apply a third language model to searches, wherein the third language model corresponds to the first dialect of the second language.

In some embodiment, the media guidance application may apply the first language model, based on the user profile, to the first voice query to identify the first plurality of search results based on the first voice query, which includes: determining a first numerical ranking for the first resolved word in the first language and a second numerical ranking for a second resolved word in the first language based on a likelihood of usage of the first resolved word in the first language and the second resolved word in the first language and determining a first composite score for the first text query based on summing the first numerical ranking and the second numerical ranking.

For example, the media guidance application may apply the English language model to a voice query of "Edward Norton". This search query may have a first resolved word and a second resolved word ranked respectively.

In some embodiments, the media guidance application may further comprise generating for display, on the display device, a first search result for the first text query, wherein the first search result is ordered among search results based on the first composite ranking.

In some embodiments, the media guidance application may identify, using control circuitry, a first audio segment and a second audio segment, based on audible breaks in the first voice query. For example, if the user says "Salma Hayek" into the user device, the media guidance application may determine that "Salma" is the first audio segment and "Hayek" is the second segment, based on the audible break in between the two words.

The media guidance application may determine a first resolved word in a first language and a second resolved word in the first language by combining a first set of phonemes to the first audio segment and second audio segment, respectively, where the first set of phonemes are selected from phonemes of the first language model. For example, "Salma" and "Hayek" may each be processed in the first language model, which could be English in this case, respectively. In some embodiments, there may be multiple potential text queries due to the various phenome combinations in each language. Since the input is in speech form, the media guidance application may analyze the segments into resolved words, which are possible forms of the input query. Accordingly, the media guidance application may interpret "Salma" as "Sulma", "Sallma", etc.

The media guidance application may determine a first numerical ranking for the first resolved word in the first language and a second numerical ranking for the second resolved word in the first language based on a likelihood of usage of the first resolved word in the first language and the second resolved word in the first language. For example, the media guidance application may rank the different possibilities for the names "Salma" and "Hayek" based on each resolved word's prevalence and likelihood of usage.

The media guidance application may determine a first composite score for the first text query based on summing the first numerical ranking and the second numerical ranking. For example, because the audio segments in the voice query are related, the media guidance application may combine the first audio segment resolved words with the second audio segment resolved words for the first language by taking the ranks of the first and second resolved words and adding them together, giving a total composite score. For example, if "Salma" and "Hayek" was found to be related, the media guidance application may combine the rank of "Salma" and "Hayek" to get the composite score.

The media guidance application may determine a first resolved word in a second language and a second resolved word in the second language by combining a second set of phonemes to the first audio segment and second audio segment, respectively, where the second set of phonemes are selected from phonemes of the second language model. For example, "Salma Hayek" may be analyzed in a second language model, e.g., Spanish, and the media guidance application may produce a variety of resolved words.

The media guidance application may determine a third numerical ranking for the first resolved word in the second language and a fourth numerical ranking for the second resolved word in the second language based on a likelihood of usage of the first resolved word in the second language and the second resolved word in the second language. For example, the media guidance application may rank the different possibilities for the names "Salma" and "Hayek" based on each resolved word's prevalence and likelihood of usage in the Spanish language.

The media guidance application may determine a second composite score for a second text query based on summing the third numerical ranking and the fourth numerical ranking. For example, the media guidance application may produce a composite score based on all the Spanish language possibilities for combinations of the resolved first and second words.

The media guidance application may generate for display, on the display device, a first search result for the first text query and a second search result for the second text query, wherein the first search result and the second search result are ordered according to the first composite ranking and the second composite ranking, respectively. For example, the composite scores of the resolved word combinations are ranked and the highest ranked combinations are outputted for display on the screen for the user to view. For example, the media guidance application may determine the highest ranked results, based on multiple language models, and the media guidance application may display results in multiple languages. In some embodiments, the search results generated for display are above a certain threshold of prevalence and likelihood of usage. For example, if the media guidance application determines that combinations are unlikely to constitute correct results (based on the low likelihood of usage), the media guidance application may not generate for display corresponding results.

In some embodiments, the media guidance application may automatically update a user profile to add a third language model for a third language for determining search results, without user input, in response to determining that metadata for a third search result indicates that the third search result corresponds to the third language. For example, based on search results corresponding to a third language, the media guidance application may add the third language to the user's profile automatically. For example, a user's speech may suggest that in addition to having English and Spanish in his or her profile, French may be applied too. French would be the third language.

In some embodiments, the media guidance application may update the user profile after receiving a user confirmation to apply the third language model for determining search results, wherein a prompt for receiving the user confirmation is generated for display in response to determining that the metadata for the third search result indicates that the third search result corresponds to the third language. For example, the media guidance application may receive a user input of a different language the user wishes to use for a search, or the media guidance application may prompt the user to manually enter that language into the user profile. Furthermore, in some embodiments, the media guidance application may update the user profile by retrieving the language setting from the user profile and comparing it to the language setting of the third language. If the media guidance application determines that the language differs from the setting, the media guidance application may update the setting, whereas if the language is the same, the setting may be maintained.

In some embodiments, the media guidance application may receive a second voice query from the user. For example, in some embodiments, the system will identify a third and fourth audio segment based on the audible breaks in the second voice query and determining, for a third text query, a first resolved word in the third language model and a second resolved word in the third language model. In such cases, additional composite scores may be determined by the media guidance application and a composite score of the composite scores may be used by the media guidance application for the ranking.

For example, the user may provide a second voice query such as "Jean Reno". The media guidance application may apply the third language model, such as French, to the query.

Figure 2:
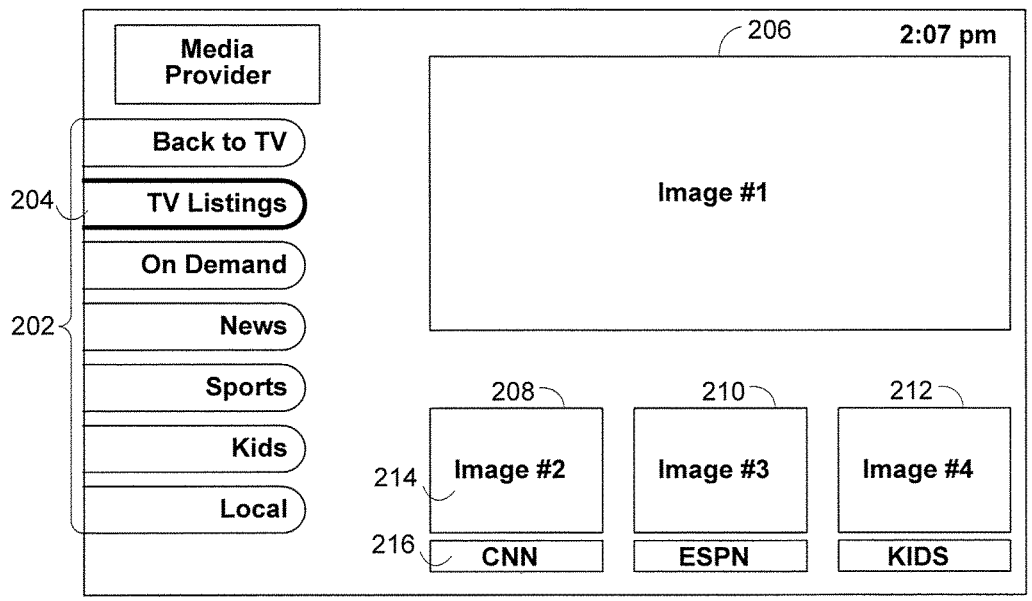
FIG. 2 shows another illustrative example of a display screen generated by a media guidance application, in accordance with some embodiments of the disclosure.

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
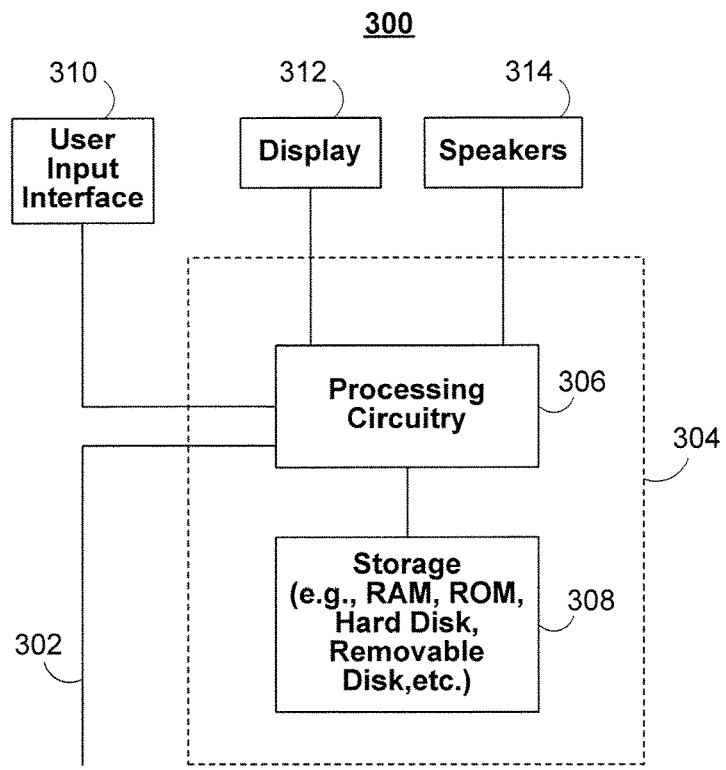
FIG. 3 shows a block diagram of an illustrative user equipment device, in accordance with some embodiments of the disclosure.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
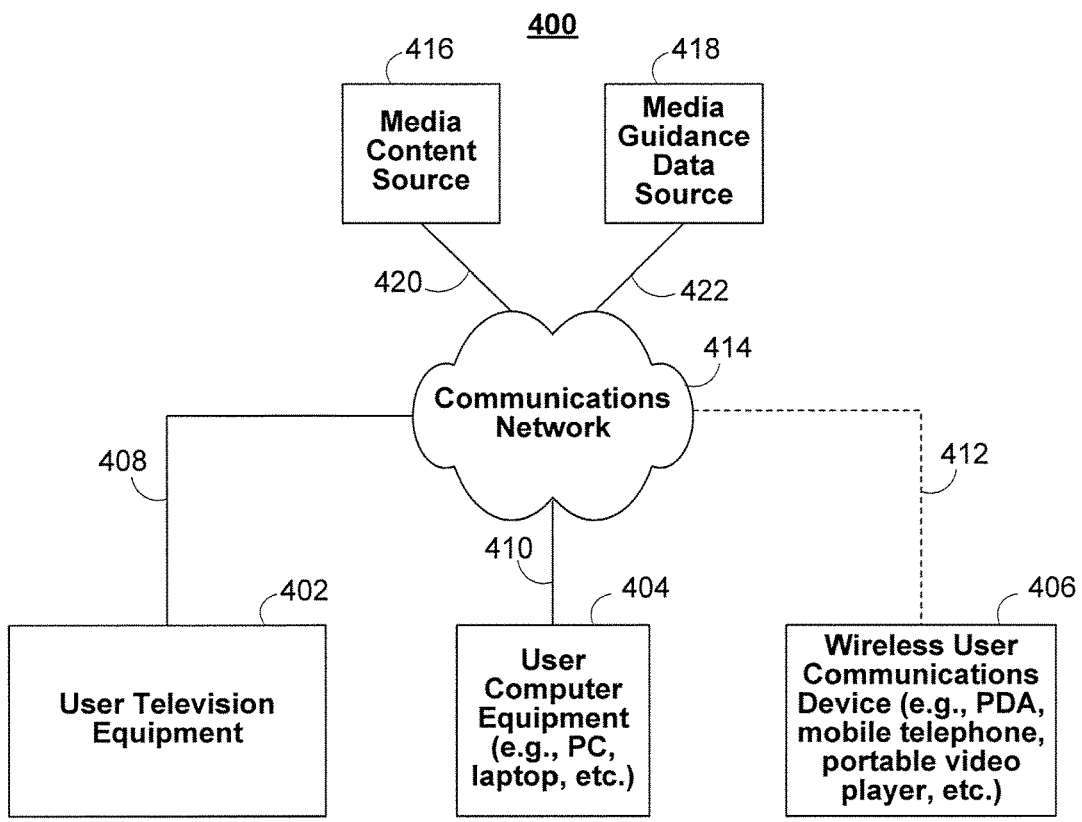
FIG. 4 shows a block diagram of an illustrative media network, in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a web-site via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
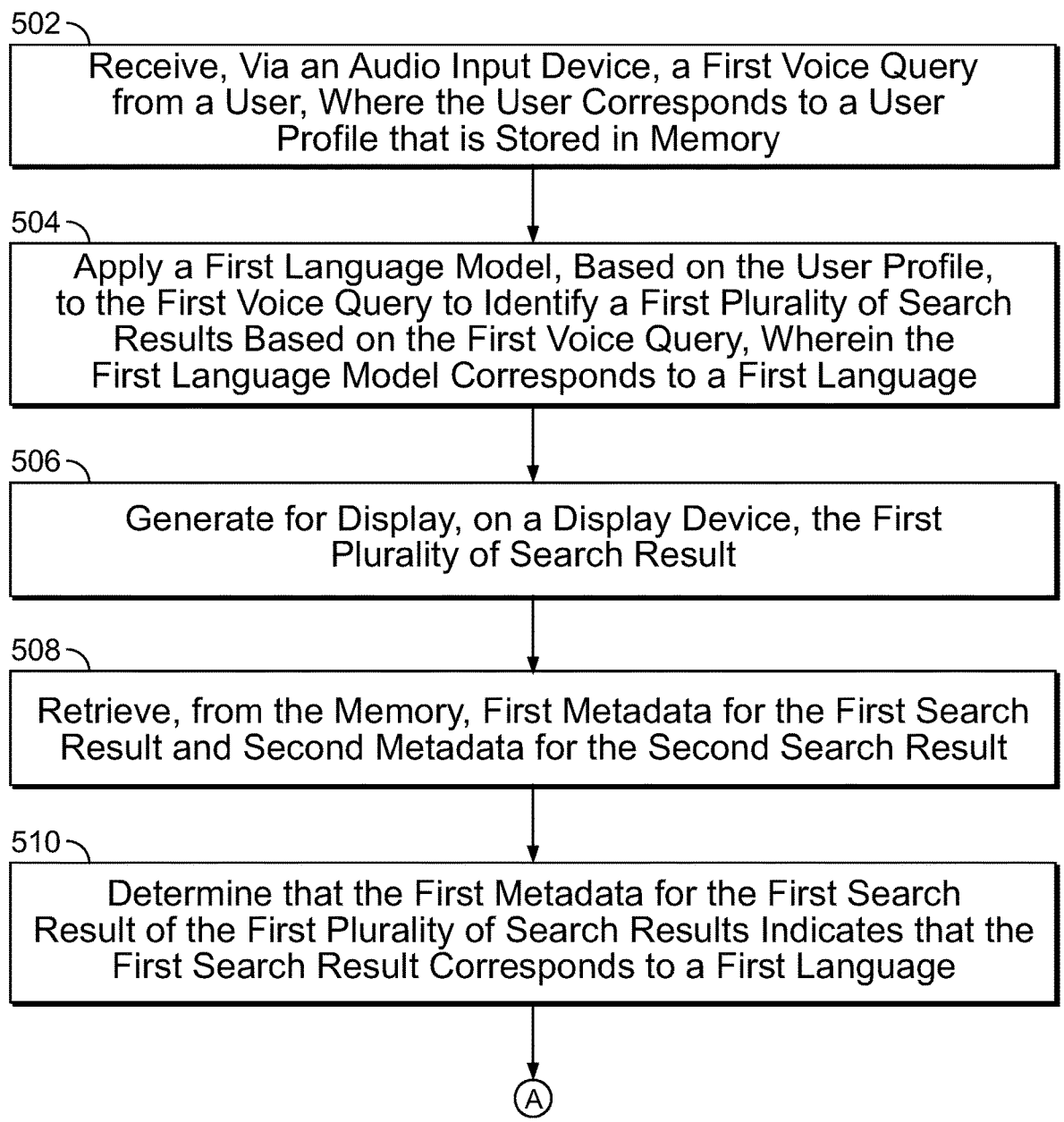
FIG. 5 is a flowchart of illustrative steps involved in automatically updating language models, in accordance with some embodiments of the disclosure.
Figure 5:
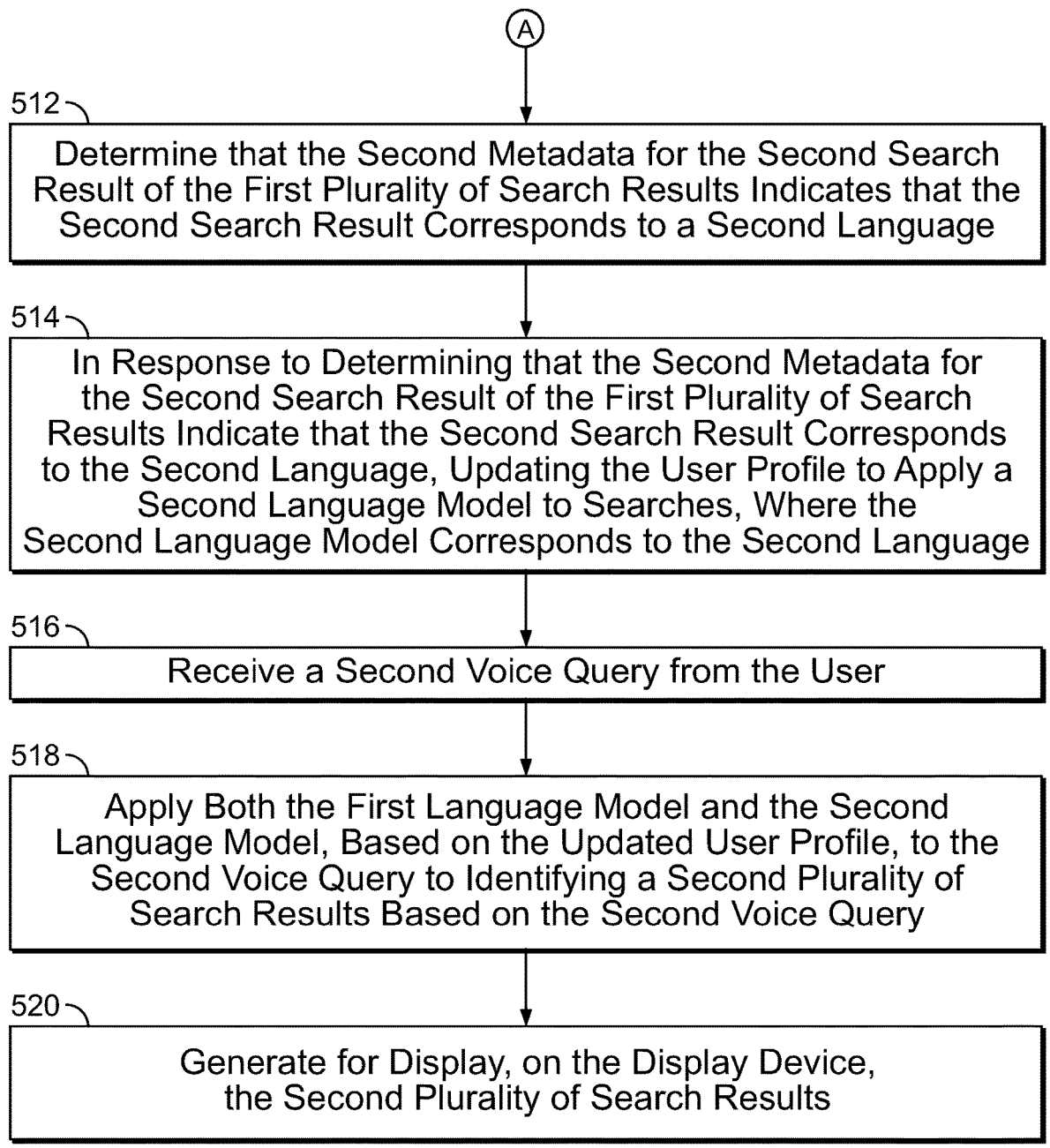

FIG. 5 is a flowchart of illustrative steps for automatically updating language models in a user profile. It should be noted that process 500 or any step thereof could be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to automatically update language models in a user profile. In addition, one or more steps of process 500 may be incorporated into or combined with one or more steps of any other process or embodiment (e.g., as described in relation to FIGS. 7-8)).

At step 502, the media guidance application receives, via an audio input device, a first voice query from a user, where the user corresponds to a user profile that is stored in memory. For example, the media guidance application (e.g., via control circuitry 304 (FIG. 3)) may receive a user dictated actor name, "George Clooney".

At step 504, the media guidance application applies a first language model, based on the user profile, to the first voice query to identify a first plurality of search results based on the first voice query, wherein the first language model corresponds to the first language. For example, the media guidance application has a first language, such as English, stored in memory (e.g., via control circuitry 304 (FIG. 3)) that will be used to produce search results.

At step 506, the media guidance application generates for display (e.g., via control circuitry 304 (FIG. 3)), on a display device, the first plurality of search results. For example, the media guidance application will show the user results on a certain display. These results will be in the first language model from the user's profile.

At step 508, the media guidance application retrieves, from the memory (e.g., via storage circuitry 308 (FIG. 3)), first metadata for the first search result and second metadata for the second search result. For example, the media guidance application will access the information related to the first search result and the second search result.

At step 510, the media guidance application determines (e.g., via control circuitry 304 (FIG. 3)) that the first metadata for the first search result of the first plurality of search results indicates that the first search result corresponds to the first language. For example, the media guidance application may determine that the search results for the first language are in fact English as indicated in the user profile.

At step 512, the media guidance application, in response to determining (e.g., via control circuitry 304 (FIG. 3)) that the second metadata for the second search result of the first plurality of search results indicates that the second search result corresponds to the second language, updates the user profile to apply a second language model to searches, where the second language model corresponds to the second language. For example, the media guidance application may determine that the second language, which could be Hindi, is reflected in the second search result.

At step 514, the media guidance application receives (e.g., via control circuitry 304 (FIG. 3)) a second voice query from the user. For example, the media guidance application may receive and additional actor or movie in which the user is interested.

At step 516, the media guidance application applies (e.g., via control circuitry 304 (FIG. 3)) both the first language model and the second language model, based on the updated user profile, to the second voice query to identify a second plurality of search results based on the second voice query. For example, if the profile has the first language model set to English and the second language model to Spanish, the media guidance application will apply both language models to produce search results.

At step 518, the media guidance application generates for display (e.g., via control circuitry 302 (FIG. 3)), on the display device, the second plurality of search results. For example, the media guidance device will show the second search results from the second voice query.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
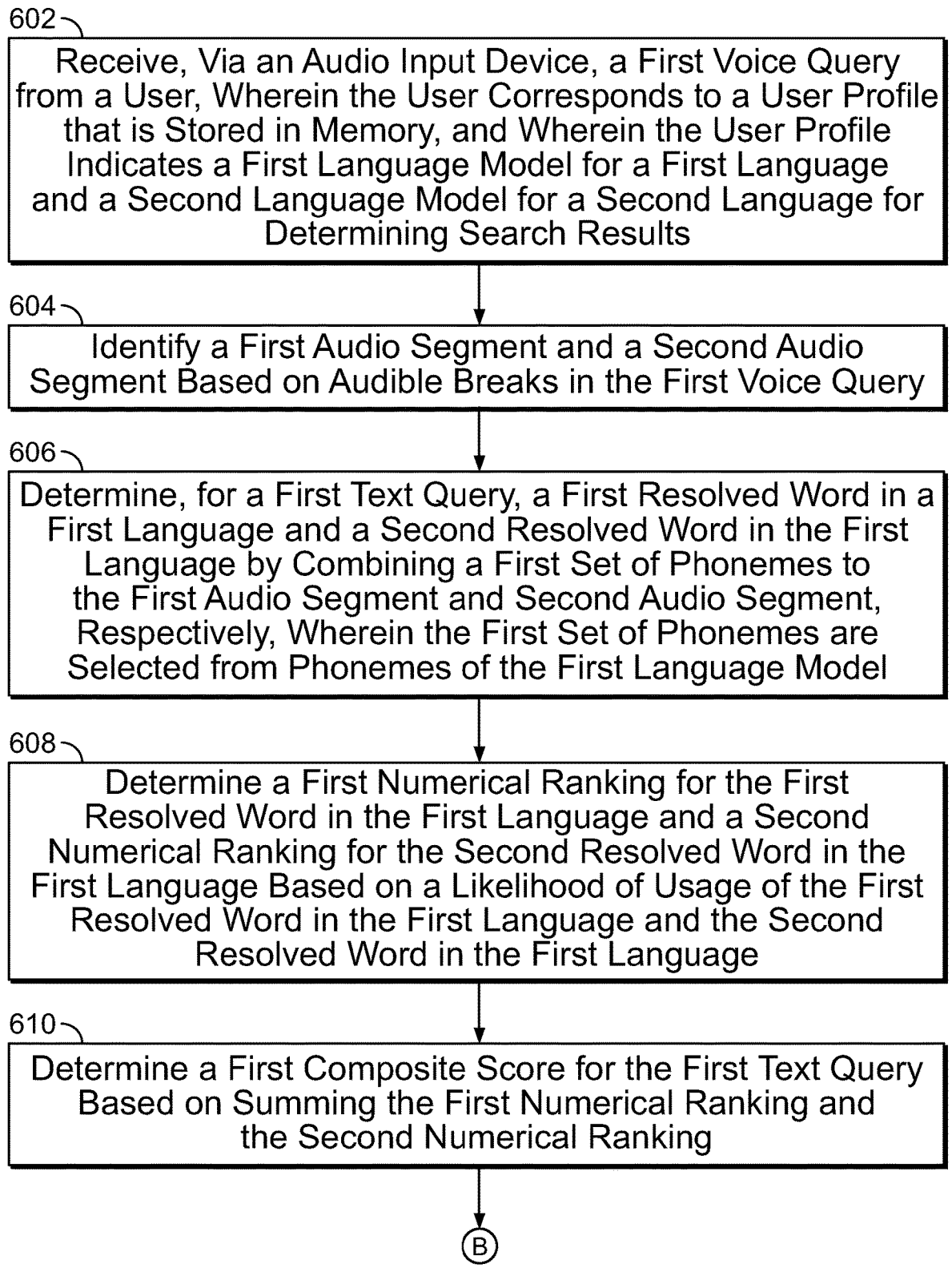
FIG. 6 is a flowchart of illustrative steps providing search results from searches in multiple languages, in accordance with some embodiments of the disclosure.
Figure 6:
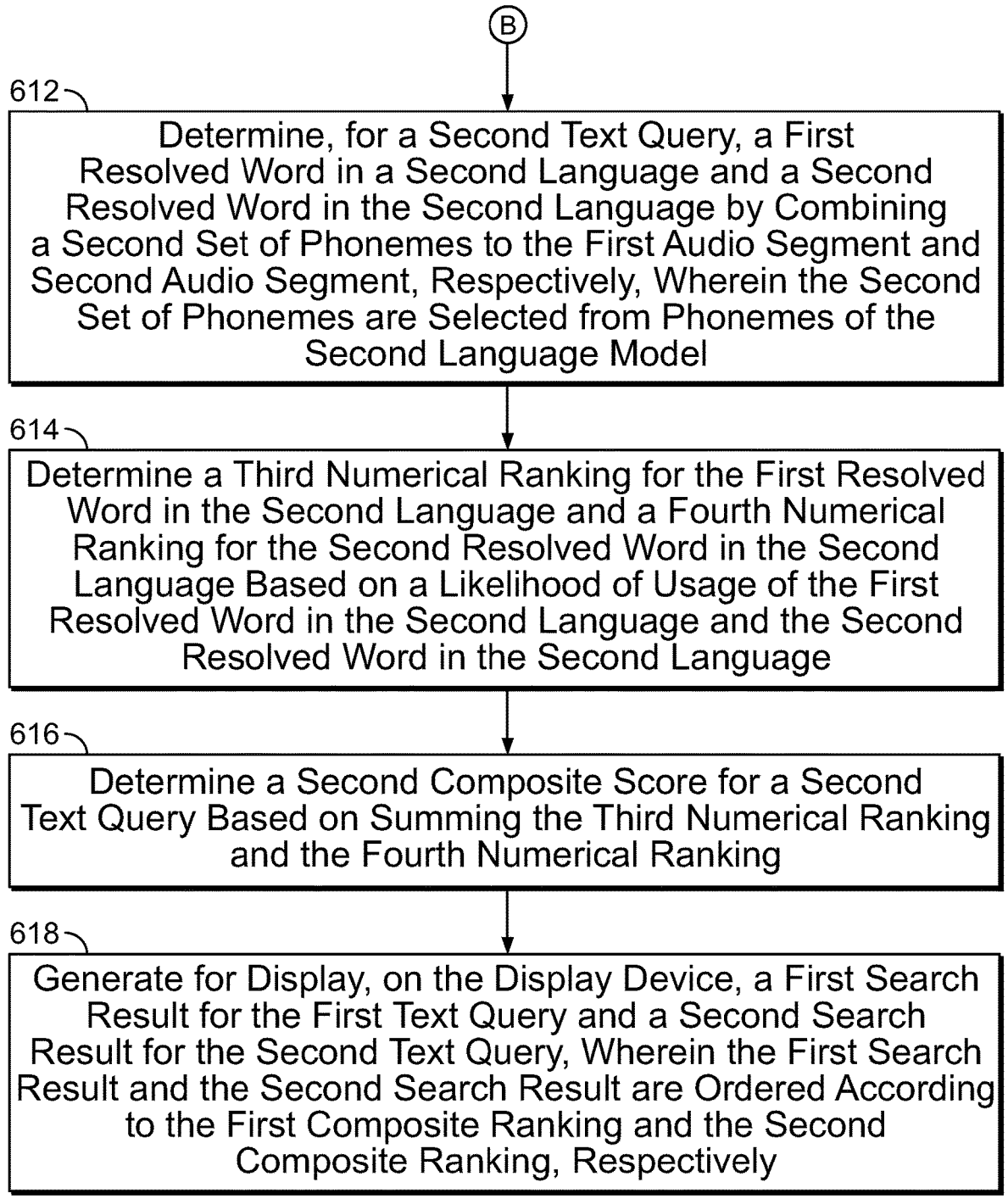

FIG. 6 is a flowchart of illustrative steps for automatically updating language models in a user profile. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to automatically update language models in a user profile. In addition, one or more steps of process 600 may be incorporated into or combined with one or more steps of any other process or embodiment (e.g., as described in relation to FIGS. 7-8)).

At step 602, the media guidance application receives (e.g., via control circuitry 302 (FIG. 3)), via an audio input device, a first voice query from a user, wherein the user corresponds to a user profile that is stored in memory (e.g., via memory circuitry 308 (FIG. 3)), and wherein the user profile indicates a first language model for a first language and a second language model for a second language for determining search results. For example, the media guidance application may have a user profile with English and Spanish stored as the first language and second language.

At step 604, the media guidance application identifies a first audio segment and a second audio segment based on audible breaks in the first voice query (e.g., via memory circuitry 302 (FIG. 3)). For example, if the first voice query is "Bob Saget", then the first audio segment is "Bob" and the second audio segment is "Saget".

At step 606, the media guidance application determines, for a first text query, a first resolved word in a first language and a second resolved word in the first language by combining a first set of phonemes to the first audio segment and second audio segment, respectively (e.g., via control circuitry 304 (FIG. 3)), wherein the first set of phonemes are selected from phonemes of the first language model. For example, if the first language is English, then the media guidance application will apply that language model to "Bob" and "Saget" and provide resolved words.

At step 608, the media guidance application determines (e.g., via control circuitry 304 (FIG. 3)) a first numerical ranking for the first resolved word in the first language and a second numerical ranking for the second resolved word in the first language based on a likelihood of usage of the first resolved word in the first language and the second resolved word in the first language (e.g., via control circuitry 304 (FIG. 3)). For example, while English is still the language model, the media guidance application will rank the resulting resolved words based on the likelihood of occurrence.

At step 610, the media guidance application determines (e.g., via control circuitry 304 (FIG. 3)) a first composite score for the first text query based on summing the first numerical ranking and the second numerical ranking (via control circuitry 304 (FIG. 3)). For example, the first and second resolved words' scores will be combined for a total composite score.

At step 612, the media guidance application determines (e.g., via control circuitry 304 (FIG. 3)), for a second text query, a first resolved word in a second language and a second resolved word in the second language by combining a second set of phonemes to the first audio segment and second audio segment, respectively, wherein the second set of phonemes are selected from phonemes of the second language model. For example, if the second stored language is Spanish, the media guidance application may apply the second language model to determine first and second resolved words.

At step 614, the media guidance application determines (e.g., via control circuitry 304 (FIG. 3)) a third numerical ranking for the first resolved word in the second language and a fourth numerical ranking for the second resolved word in the second language, based on a likelihood of usage of the first resolved word in the second language and the second resolved word in the second language. For example, the media guidance application may use the second language model to produce resolved words and those resolved words in the second language will then be ranked.

At step 616, the media guidance application determines (e.g., via control circuitry 302 (FIG. 4)) a second composite score for a second text query based on summing the third numerical ranking and the fourth numerical ranking. For example, the media guidance application may combine the third and fourth numerical rankings to gather a composite score.

At step 618, the media guidance application generates for display (e.g., via control circuitry 312 (FIG. 3)), on the display device, a first search result for the first text query and a second search result for the second text query, wherein the first search result and the second search result are ordered according to the first composite ranking and the second composite ranking, respectively. For example, the media guidance application will display for the user the text output of the text queries.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
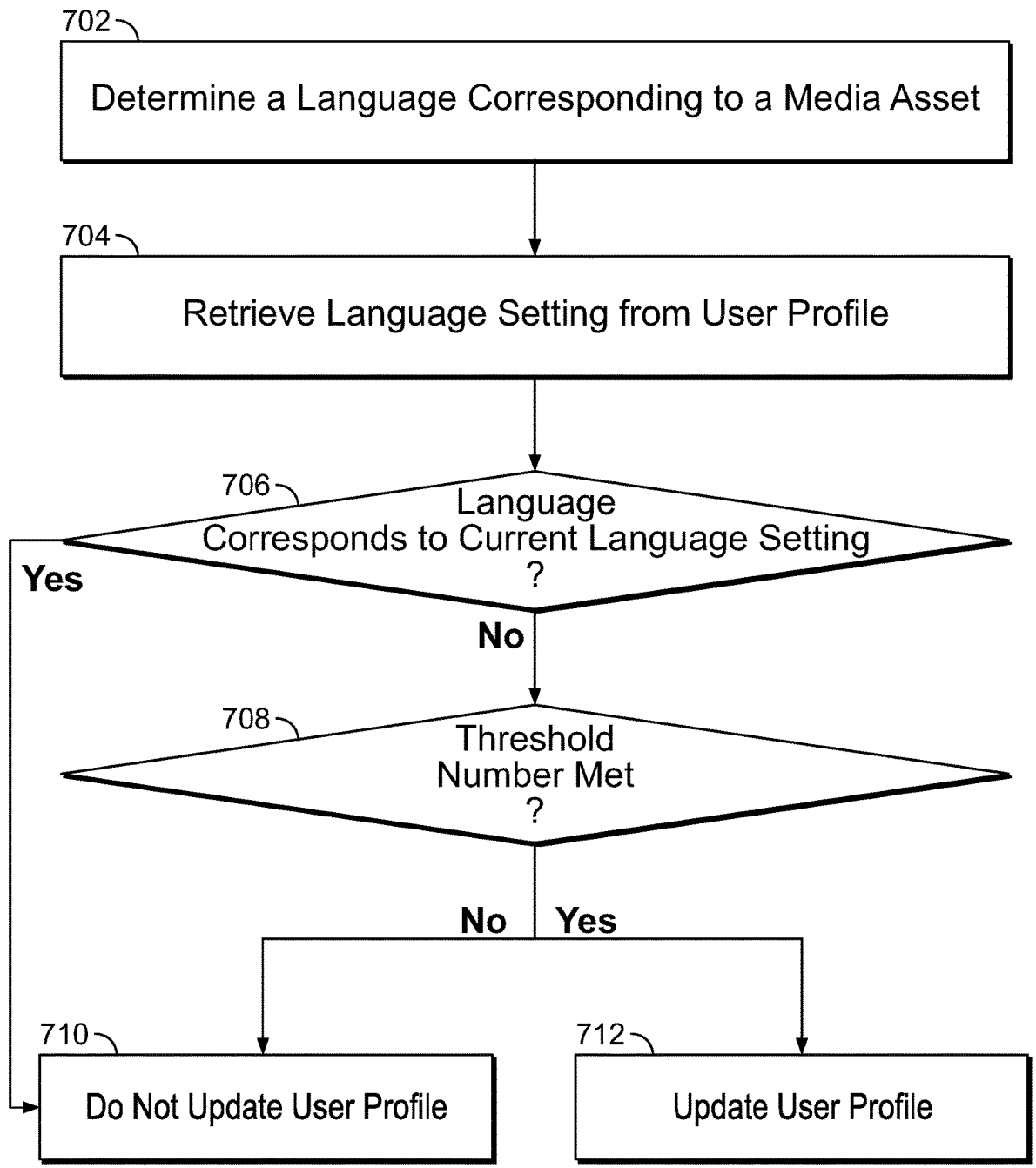
FIG. 7 is a flowchart of illustrative steps for whether to update a user profile or not, in accordance with some embodiments of the disclosure.

FIG. 7 is a flowchart of illustrative steps for whether to update a user profile or not. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to update a user profile or not. In addition, one or more steps of process 700 may be incorporated into or combined with one or more steps of any other process or embodiment (e.g., as described in relation to FIGS. 7-8)).

At step 702, the media guidance application determines (e.g., via control circuitry 304 (FIG. 3)) a language corresponding to a media asset. For example, the media guidance application may determine to set the language to English either from user input or automatically.

At step 704, the media guidance application retrieves (e.g., via control circuitry 302 (FIG. 3)) a language setting from user profile (e.g., as stored in storage 308 (FIG. 3) and/or any location accessible via communications network 414 (FIG. 4)). For example, the media guidance application may retrieve a language setting of English.

At step 706, the media guidance application assesses (e.g., via control circuitry 304 (FIG. 3)) whether the language corresponds to the current language setting. If the language is the same, the media guidance application will jump to step 710. If the language is different, the media guidance application will proceed to step 708. For example, if English is already a stored language in memory, the application will not update the user profile.

At step 708, the media guidance application assesses (e.g., via control circuitry 304 (FIG. 3)) if a threshold number is met. If the threshold is met, the media guidance application will proceed to step 712. However, if the threshold is not met, the application will proceed to step 710. For example, if the English language model does not satisfy the threshold, the application will not update the user profile.

At step 710, the media guidance application receives input (e.g., via control circuitry 302 (FIG. 3)) from previous steps and does not update the user profile. For example, if the language chosen is a duplicate, then the application will not update the user profile.

At step 712, the media guidance application receives input (e.g., via control circuitry 302 (FIG. 3)) and updates the user profile. For, example, if the language chosen is unique and meets the threshold, the application will update the user profile.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
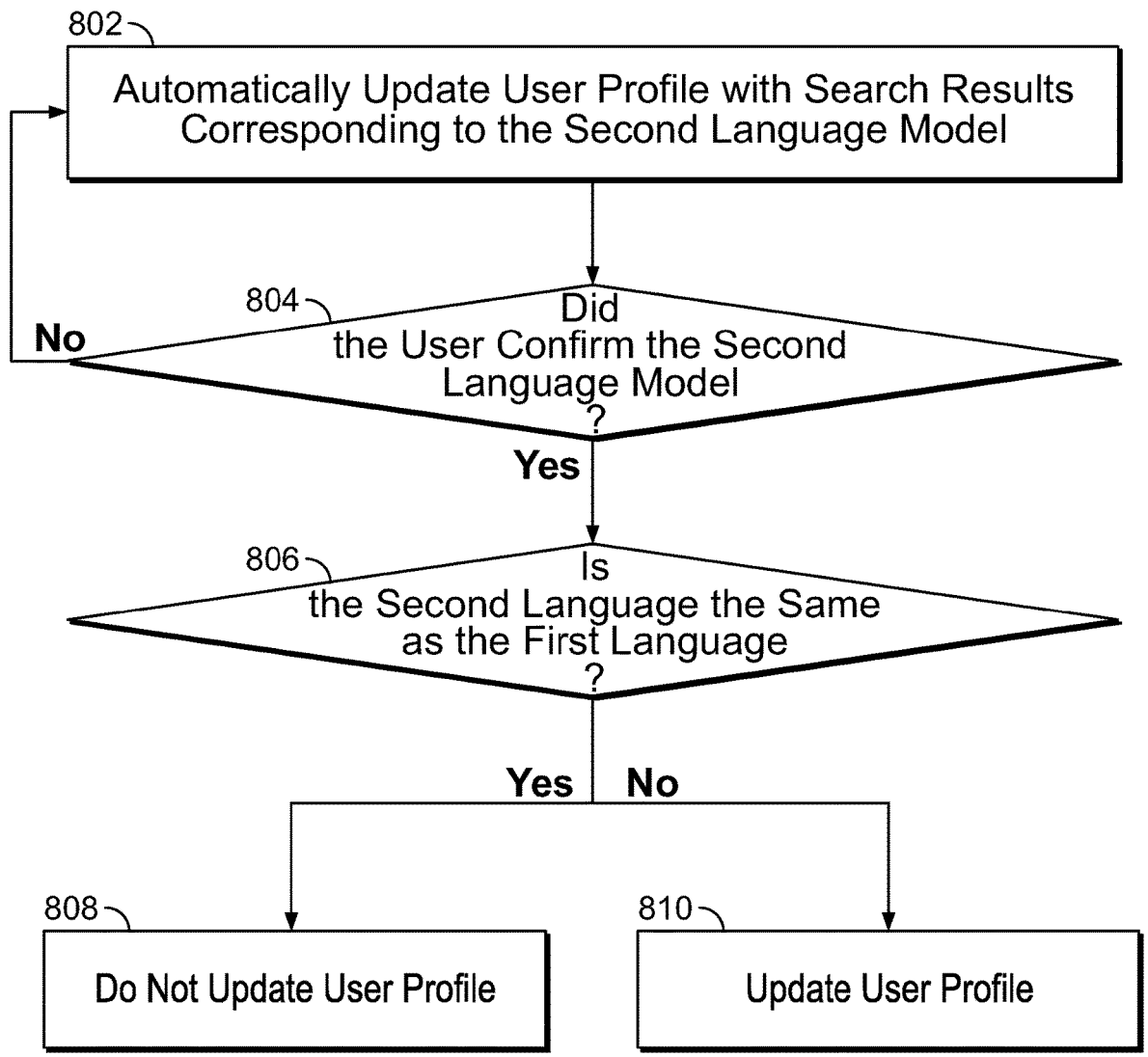
FIG. 8 is another flowchart of illustrative steps for whether to update a user profile or not, in accordance with some embodiments of the disclosure.

FIG. 8 is a flowchart of illustrative steps for whether to update a user profile or not. It should be noted that process 700 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to update a user profile or not. In addition, one or more steps of process 800 may be incorporated into or combined with one or more steps of any other process or embodiment (e.g., as described in relation to FIGS. 7-8)).

At step 802, the media guidance application automatically updates (e.g., via control circuitry 304 (FIG. 3)), user profile with search results corresponding to the second language model. For example, the application may change the second language to French.

At step 804, the media guidance application assesses (e.g., via control circuitry 314 (FIG. 3)) whether the user confirmed the second language model. If the user did confirm the second language the media application will proceed to step 806; however, if the user did not confirm, the application will proceed to step 802. For example, the user may not confirm the second language if it was updated automatically to a language not desired by the user.

At step 806, the media guidance application assesses (e.g., via control circuitry 304 (FIG. 3)) whether the second language is the same as the first. For example, if the second language is updated to French, but French is already stored as the first language, the application will proceed to step 808. If the language is something other than French, the application will proceed to step 810.

At step 808, the media guidance application may not update (e.g., via control circuitry 302 (FIG. 3)) the user profile. For example, if the updated language is the same as the first, then the application may not update the user profile (e.g., via memory circuitry 308 (FIG. 3)).

At step 810, the media guidance application updates the user profile. For example, if the second language is different from the first, the application will update the user profile (via memory circuitry 308 (FIG. 3)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The invention claimed is:

1. A method for generating results for search queries based on multiple language models, comprising:
receiving a first voice query from a user via an audio input device, wherein the user corresponds to a user profile that is stored in memory;
parsing the first voice query into a first audio segment and a second audio segment based on audible breaks in the first voice query;
determining for a first text query, a first resolved word in a first language and a second resolved word in the first language by combining a first set of phonemes to the first audio segment and the second audio segment, wherein the first set of phonemes are selected from a plurality of phonemes of the first language, wherein the user profile is updated with a first language model corresponding to the first language;
determining a first composite score for the first text query by combining a first numerical ranking for the first resolved word and a second numerical ranking for the second resolved word in the first language;
determining for a second text query, a first resolved word in a second language and a second resolved word in the second language by combining a second set of phonemes to the first audio segment and the second audio segment, wherein the second set of phonemes are selected from a plurality of phonemes of the second language, wherein the user profile is updated with a second language model corresponding to the second language;
determining a second composite score for the second text query by combining a third numerical ranking for the first resolved word and a fourth numerical ranking for the second resolved word in the second language;
applying both the first language model and the second language model based on the updated user profile to the first text query and the second text query, respectively; and
generating, for display, a first search result for the first text query and a second search result for the second text query, wherein the first search result and the second search result are ordered according to the first composite score and the second composite score.

2. The method of claim 1, further comprising:
applying a first language model, based on the user profile, to the first voice query to identify a first plurality of search results based on the first voice query, wherein the first language model corresponds to the first language;
generating for display, on a display device, the first plurality of search results;
retrieving first metadata for a first search result of the first plurality of search results and second metadata for a second search result of the first plurality of search results;
automatically determining that the first metadata for the first search result of the first plurality of search results indicates that the first search result corresponds to the first language;
automatically determining that the second metadata for the second search result of the first plurality of search results indicates that the second search result corresponds to the second language;
in response to determining that the second metadata for the second search result of the first plurality of search results indicates that the second search result corresponds to a second language, updating the user profile to apply the second language model to searches, wherein the second language model corresponds to the second language;
receiving a second voice query from the user;
applying both the first language model and the second language model, based on the updated user profile, to the second voice query to identify a second plurality of search results based on the second voice query; and
generating for display, on the display device, the second plurality of search results.

3. The method of claim 2, wherein the user profile is automatically updated, without user input, in response to determining that the second metadata for the second search result of the first plurality of search results indicates that the second search result corresponds to the second language.

4. The method of claim 3, wherein the user profile is updated after receiving a user confirmation to apply the second language model to searches, wherein a prompt for receiving the user confirmation is generated for display in response to determining that the second metadata for the second search result of the first plurality of search results indicates that the second search result corresponds to the second language.

5. The method of claim 4, wherein updating the user profile further comprises:
retrieving a language setting from the user profile;
comparing a language corresponding to the language setting to the second language; and
determining that the second language does not correspond to the language corresponding to the language setting.

6. The method of claim 5, further comprising:
in response to determining that the first metadata for the first search result of the first plurality of search results indicates that the first search result corresponds to the first language, maintaining a language setting in the user profile that applies the first language model to searches.

7. The method of claim 6, further comprising:
automatically determining that the second metadata for the second search result of the first plurality of search results also indicates that the second search result corresponds to a first dialect of the second language;
in response to determining that the second metadata for the second search result of the first plurality of search results also indicates that the second search result corresponds to the first dialect of the second language, updating the user profile to apply a third language model to searches, wherein the third language model corresponds to the first dialect of the second language.

8. The method of claim 6, wherein the first language model indicates a first set of phonemes used to identify the first plurality of search results.

9. A system for generating results for search queries based on multiple language models, comprising:
memory configured to store a plurality of language models; and
control circuitry configured to:
receive a first voice query from a user, wherein the user corresponds to a user profile that is stored in memory;
identify a first audio segment and a second audio segment based on audible breaks in the first voice query;
determine for a first text query, a first resolved word in a first language and a second resolved word in the first language by combining a first set of phonemes to the first audio segment and the second audio segment, wherein the first set of phonemes are selected from a plurality of phonemes of the first language;
determine a first composite score for the first text query by combining a first numerical ranking for the first resolved word and a second numerical ranking for the second resolved word in the first language;
determine for a second text query, a first resolved word in a second language and a second resolved word in the second language by combining a second set of phonemes to the first audio segment and the second audio segment, wherein the second set of phonemes are selected from a plurality of phonemes of the second language;
determine a second composite score for the second text query by combining a third numerical ranking for the first resolved word and a fourth numerical ranking for the second resolved word in the second language; and
generating, for display, a first search result for the first text query and a second search result for the second text query, wherein the first search result and the second search result are ordered according to the first composite score and the second composite score.

10. The system of claim 9, wherein the control circuitry is further configured to:
apply a first language model, based on the user profile, to the first voice query to identify a first plurality of search results based on the first voice query, wherein the first language model corresponds to the first language;
generate for display, on a display device, the first plurality of search results;
retrieve first metadata for a first search result of the first plurality of search results and second metadata for a second search result of the first plurality of search results;
automatically determine that the first metadata for the first search result of the first plurality of search results indicates that the first search result corresponds to the first language;
automatically determine that the second metadata for the second search result of the first plurality of search results indicates that the second search result corresponds to the second language;
in response to determining that the second metadata for the second search result of the first plurality of search results indicates that the second search result corresponds to a second language, update the user profile to apply the second language model to searches, wherein the second language model corresponds to the second language;
receive a second voice query from the user;
apply both the first language model and the second language model, based on the updated user profile, to the second voice query to identify a second plurality of search results based on the second voice query; and
generate for display, on the display device, the second plurality of search results.

11. The system of claim 10, wherein the user profile is automatically updated, without user input, in response to determining that the second metadata for the second search result of the first plurality of search results indicates that the second search result corresponds to the second language.

12. The system of claim 11, wherein the user profile is updated after receiving a user confirmation to apply the second language model to searches, wherein a prompt for receiving the user confirmation is generated for display in response to determining that the second metadata for the second search result of the first plurality of search results indicates that the second search result corresponds to the second language.

13. The system of claim 12, wherein updating the user profile further comprises:
retrieving a language setting from the user profile;
comparing a language corresponding to the language setting to the second language; and
determining that the second language does not correspond to the language corresponding to the language setting.

14. The system of claim 13, wherein the control circuitry is further configured to:
in response to determining that the first metadata for the first search result of the first plurality of search results indicates that the first search result corresponds to the first language, maintaining a language setting in the user profile that applies the first language model to searches.

15. The system of claim 14, wherein the control circuitry is further configured to:
automatically determining that the second metadata for the second search result of the first plurality of search results also indicates that the second search result corresponds to a first dialect of the second language;
in response to determining that the second metadata for the second search result of the first plurality of search results also indicates that the second search result corresponds to the first dialect of the second language, updating the user profile to apply a third language model to searches, wherein the third language model corresponds to the first dialect of the second language.

16. The system of claim 15, wherein the first language model indicates a first set of phonemes used to identify the first plurality of search results.

17. A non-transitory machine-readable medium comprising machine-readable instructions encoded thereon for performing a method of generating results for search queries based on multiple language models, the method comprising:
   receiving a first voice query from a user, wherein the user corresponds to a user profile that is stored in memory;
   identifying a first audio segment and a second audio segment based on audible breaks in the first voice query;
   determining for a first text query, a first resolved word in a first language and a second resolved word in the first language by combining a first set of phonemes to the first audio segment and the second audio segment, wherein the first set of phonemes are selected from a plurality of phonemes of the first language;
   determining a first composite score for the first text query by combining a first numerical ranking for the first resolved word and a second numerical ranking for the second resolved word in the first language;
   determining for a second text query, a first resolved word in a second language and a second resolved word in the second language by combining a second set of phonemes to the first audio segment and the second audio segment, wherein the second set of phonemes are selected from a plurality of phonemes of the second language;
   determining a second composite score for the second text query by combining a third numerical ranking for the first resolved word and a fourth numerical ranking for the second resolved word in the second language; and
   generating, for display, a first search result for the first text query and a second search result for the second text query, wherein the first search result and the second search result are ordered according to the first composite score and the second composite score.

18. The non-transitory machine-readable medium of claim 17, the method further comprising:
   applying a first language model, based on the user profile, to the first voice query to identify a first plurality of search results based on the first voice query, wherein the first language model corresponds to the first language;
   generating for display, on a display device, the first plurality of search results;
   retrieving first metadata for a first search result of the first plurality of search results and second metadata for a second search result of the first plurality of search results;
   automatically determining that the first metadata for the first search result of the first plurality of search results indicates that the first search result corresponds to the first language;
   automatically determining that the second metadata for the second search result of the first plurality of search results indicates that the second search result corresponds to the second language;
   in response to determining that the second metadata for the second search result of the first plurality of search results indicates that the second search result corresponds to a second language, updating the user profile to apply the second language model to searches, wherein the second language model corresponds to the second language;
   receiving a second voice query from the user;
   applying both the first language model and the second language model, based on the updated user profile, to the second voice query to identify a second plurality of search results based on the second voice query; and
   generating for display, on the display device, the second plurality of search results.

19. The non-transitory machine-readable medium of claim 18, wherein the user profile is automatically updated, without user input, in response to determining that the second metadata for the second search result of the first plurality of search results indicates that the second search result corresponds to the second language.

20. The non-transitory machine-readable medium of claim 19, wherein the user profile is updated after receiving a user confirmation to apply the second language model to searches, wherein a prompt for receiving the user confirmation is generated for display in response to determining that the second metadata for the second search result of the first plurality of search results indicates that the second search result corresponds to the second language.

* * * * *